US 6,683,430 B2

(12) United States Patent
Pavlov et al.

(10) Patent No.: US 6,683,430 B2
(45) Date of Patent: Jan. 27, 2004

(54) METHOD FOR ADJUSTING AN INPUT PARAMETER OF AN ADJUSTABLE BOLSTER ON A SEAT

(75) Inventors: Kevin J. Pavlov, Livonia, MI (US); Pahngroc Oh, Ann Arbor, MI (US); Stephen M. Stachowski, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/182,106

(22) PCT Filed: Nov. 27, 2001

(86) PCT No.: PCT/US01/44502
§ 371 (c)(1),
(2), (4) Date: Jul. 24, 2002

(87) PCT Pub. No.: WO02/41737
PCT Pub. Date: May 30, 2002

(65) Prior Publication Data
US 2003/0011337 A1 Jan. 16, 2003

Related U.S. Application Data

(60) Provisional application No. 60/253,317, filed on Nov. 27, 2000.

(51) Int. Cl.$^7$ .................................................. G05B 5/00
(52) U.S. Cl. ........................ 318/466; 318/468; 318/469
(58) Field of Search ................................. 318/466, 469, 318/467, 468, 470, 484, 489; 180/446, 422

(56) References Cited

U.S. PATENT DOCUMENTS

| 3,452,834 | A |   | 7/1969  | Gaut             |         |
|-----------|---|---|---------|------------------|---------|
| 4,526,516 | A | * | 7/1985  | Swain et al.     | 417/222.2 |
| 4,722,550 | A |   | 2/1988  | Imaoka et al.    |         |
| 4,900,079 | A |   | 2/1990  | Obara et al.     |         |
| 4,924,162 | A |   | 5/1990  | Sakamoto et al.  |         |
| 5,130,622 | A |   | 7/1992  | Takizawa et al.  |         |
| 5,263,765 | A |   | 11/1993 | Nagashima et al. |         |
| 5,320,409 | A |   | 6/1994  | Katoh et al.     |         |
| 5,490,706 | A |   | 2/1996  | Totani           |         |
| 5,556,160 | A |   | 9/1996  | Mikami           |         |
| 5,567,006 | A |   | 10/1996 | McCarthy         |         |
| 5,707,109 | A |   | 1/1998  | Massara et al.   |         |
| 5,743,591 | A |   | 4/1998  | Tame             |         |
| 5,975,508 | A |   | 11/1999 | Beard            |         |
| 6,024,378 | A |   | 2/2000  | Fu               |         |
| 6,037,731 | A |   | 3/2000  | Fruehauf et al.  |         |
| 6,056,079 | A |   | 5/2000  | Cech et al.      |         |
| 6,059,253 | A |   | 5/2000  | Koutsky et al.   |         |
| 6,088,642 | A |   | 7/2000  | Finkelstein et al.|        |
| 6,089,344 | A | * | 7/2000  | Baughn et al.    | 180/446 |
| 6,120,082 | A |   | 9/2000  | Vandermolen      |         |
| 6,122,568 | A |   | 9/2000  | Madau et al.     |         |
| 6,182,783 | B1 |  | 2/2001  | Bayley           |         |
| 6,193,297 | B1 |  | 2/2001  | Vandermolen      |         |

FOREIGN PATENT DOCUMENTS

| DE | 19823058 A1 | 12/1999 |
| JP | 63315342    | 12/1988 |

OTHER PUBLICATIONS

PCT Publication, WO 00/12350, Mar. 9, 2000.

\* cited by examiner

*Primary Examiner*—Karen Masih
(74) *Attorney, Agent, or Firm*—Brinks Hofer Gilson & Lione

(57) ABSTRACT

A method for adjusting an input parameter of an adjustable bolster (12) on a seat (10) of a vehicle (22). The preferred method includes (a) establishing a relationship between the input parameter and a feedback force on the adjustable bolster (12) and (b) adjusting the input parameter based on the relationship.

16 Claims, 3 Drawing Sheets

METHOD FOR ADJUSTING AN INPUT PARAMETER OF AN ADJUSTABLE BOLSTER ON A SEAT

CROSS-REFERENCE TO PRIOR APPLICATIONS

The present invention claims priority to U.S. Provisional Application Ser. No. 60/253,317, filed Nov. 27, 2000 and entitled "Dynamic Adjustable Seating".

TECHNICAL FIELD

The present invention relates generally to a method for adjusting an input parameter of an adjustable bolster on a seat of a vehicle and, more particularly, to a method for adjusting the input parameter based on a relationship between the input parameter and a feedback force on the adjustable bolster.

BACKGROUND

Although appearing in more printed publications than actual vehicles, the concept of a seating system having an automatically adjustable bolster activated by a control unit is well known. U.S. Pat. No. 4,924,162, which is hereby incorporated in its entirely by this reference, discloses such seating system. The seating systems of the prior art are open-loop systems. In other words, the force of the adjustable bolsters against the skin and structure of the occupant of the seat is not sensed and is not a basis for the future control of the adjustable bolster. For this reason, occupants with skin and structure much different than the hypothetical occupant for which the seating system is optimized may experience less than or more than ideal forces from the adjustable bolster during a situation of lateral acceleration of the vehicle. For this reason, there is a need in the art of seating systems to provide an improved activation of the adjustable bolster.

DESCRIPTION OF THE PREFERRED METHOD

The following description of the preferred method is not intended to limit the invention to the preferred method, but rather to enable any person skilled in the art of vehicle seats to make and use this invention.

Figure 1:
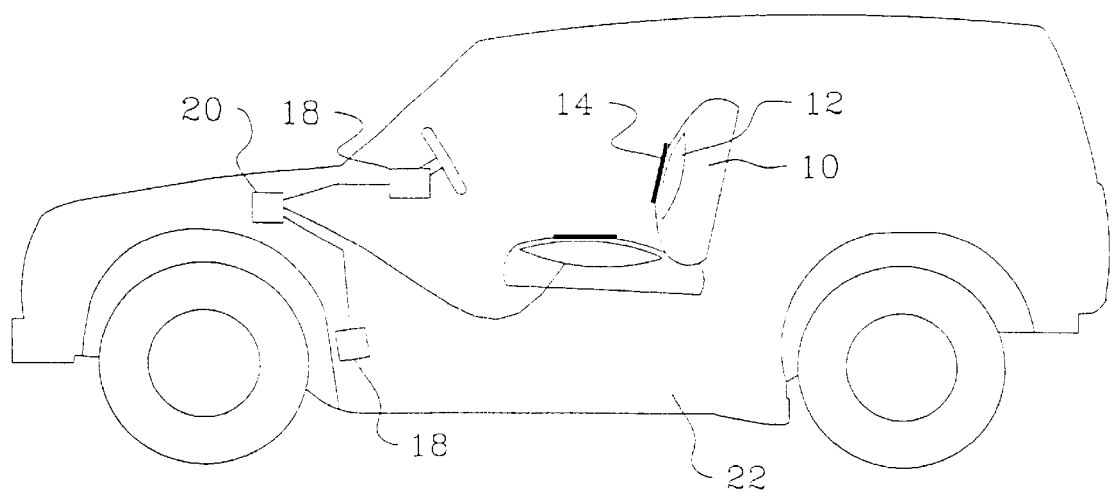
FIG. 1 is a side view of a seat in a vehicle with an adjustable bolster, which may be used with the preferred method of the invention.
Figure 2:
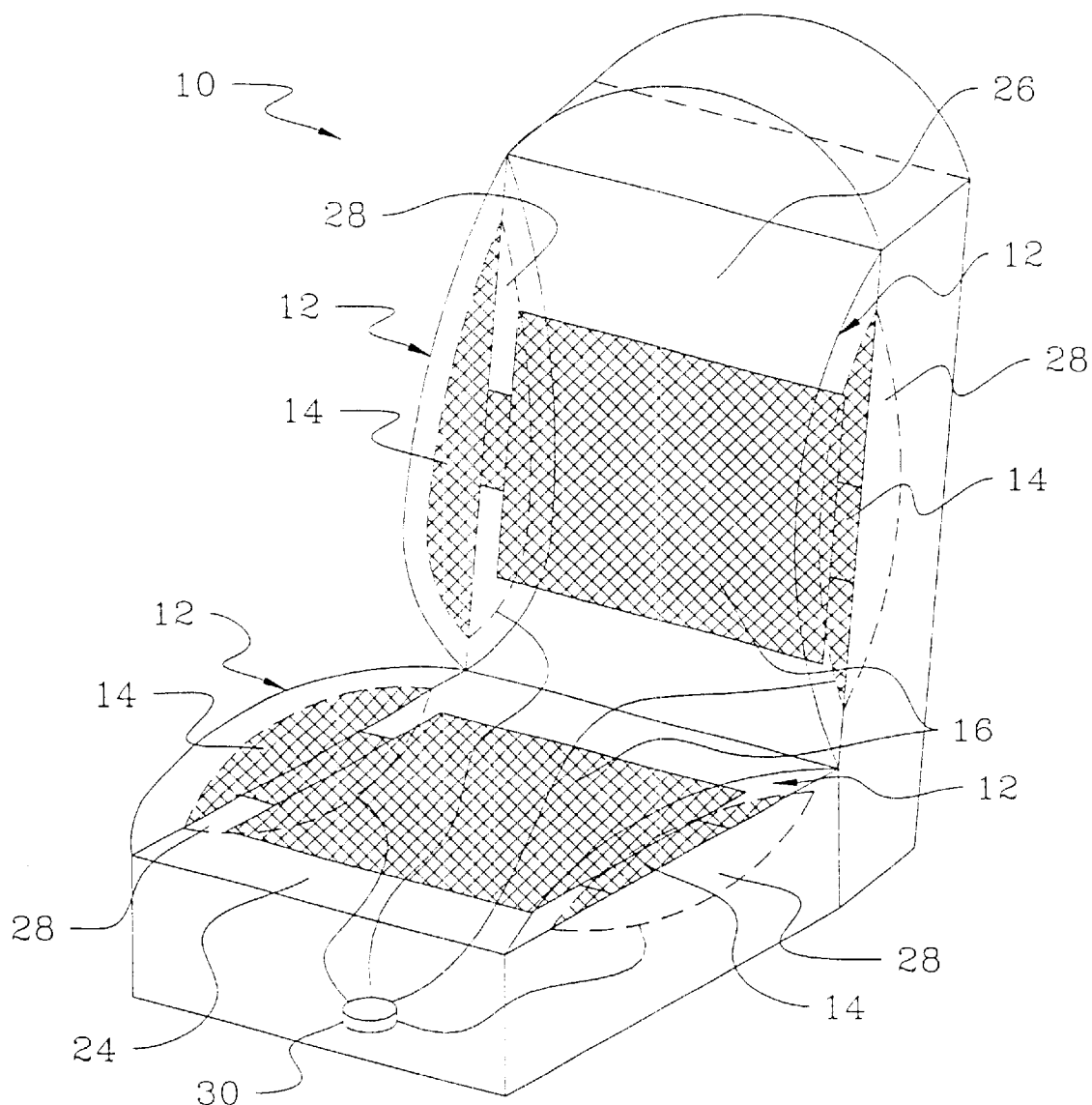
FIG. 2 is a perspective view of the seat of FIG. 1.

As shown in FIGS. 1 and 2, the preferred method of the invention is preferably used with a seat 10, an adjustable bolster 12, a feedback force sensor 14, an occupant detection sensor 16, a vehicle parameter sensor 18, and a control unit 20. Although the preferred method has been specifically designed for a seat 10 of a vehicle 22, the preferred method may be designed and used for a seat in other suitable environments, such as in a watercraft or in an aircraft.

As shown in FIG. 2, the seat 10, which functions to support an occupant (not shown), preferably includes a seat section 24 and a back section 26. The seat section 24 and the back section 26 are preferably made in a conventional manner, which includes providing a metal frame, a foam cushion, and a cloth or leather trim (not shown). The seat section 24 and the back section 26 may alternatively be made in any suitable manner. The back section 26 is preferably connected to the seat section 24 with a conventional angle-adjustable mechanism (not shown), but may alternatively be connected with any suitable device. Likewise, the seat section 24 is preferably connected to the vehicle 22 with a conventional position-adjustable mechanism (not shown), but may alternatively be connected with any suitable device.

The adjustable bolster 12 of the seating system, which functions to provide side support for the occupant during a situation of lateral acceleration, is preferably made in a conventional manner, which includes an inflatable bladder 28 and a pneumatic pump 30. The adjustable bolster 12 may alternatively be made in any suitable manner, such as with a bladder inflatable by a hydraulic pump, or with a paddle adjustable with a motor. The inflatable bladder 28 is preferably connected to the outer edges of the seat section 24 and to the outer edges of the back section 26 with conventional fasteners (not shown), but may alternatively be connected to the seat section 24 and the back section 26 with any suitable fastener. The seat 10 preferably includes four adjustable bolsters 12, but may alternatively include one or more adjustable bolsters 12 at any suitable location. The pneumatic pump 30 is preferably located under the seat section 24 of the seat 10, but may alternatively be located at any suitable location in the vehicle.

The feedback force sensor 14, which functions to sense the force of the adjustable bolster 12 against the occupant of the seat 10, preferably includes conventional pressure transducers. Conventional pressure transducers are generally described in U.S. Pat. No. 6,024,378 issued on Feb. 15, 2000 and assigned to the Lear Corporation, which is hereby incorporated in its entirety by this reference. The feedback force sensor 14, however, may include any suitable device that adequately senses the force of the adjustable bolster 12 against the occupant of the seat 10. The seat 10 preferably includes a feedback force sensor 14 for every adjustable bolster 12 of the seat 10. The seat 10, however, may include any suitable number of feedback force sensors 14. The feedback force sensor 14 is preferably located between the foam cushion and the cloth or leather trim and connected to the control unit, but may alternatively be located in any suitable location to sense the force of the adjustable bolster 12 on the occupant.

As shown in FIGS. 1 and 2, the occupant detection sensor 16 functions to detect the presence or absence of an occupant in the seat 10. Like the feedback force sensor 14, the occupant detection sensor 16 preferably includes a conventional pressure transducer. The occupant detection sensor 16 is preferably located in the seat section 24 and the back section 26 of the seat 10, which allows the control unit 20 to distinguish between an object placed on the seat 10 and an occupant seated on the seat 10. The occupant detection sensor 16 may alternatively be located in any suitable location to detect the presence or absence of an occupant. Like the feedback force sensor 14, the occupant detection sensor 16 is preferably located between the foam cushion and the cloth or leather trim and connected to the control unit 20, but may alternatively be located in any suitable location to sense the presence or absence of an occupant in the seat 10.

The vehicle parameter sensor 18 functions to detect a situation in which the occupant of the seat 10 may prefer or need to have an increased engagement of the adjustable bolster 12. An increased engagement of the adjustable bolster 12 may allow the occupant to better react against the centrifugal forces induced by a turn or the lateral acceleration induced by the road. Preferably, the vehicle parameter sensor 18 is a conventional lateral accelerometer located in a suitable location in the vehicle 22 and connected to the control unit 20. Alternatively, the vehicle parameter sensor 18 may include a steering wheel angle sensor and a vehicle speed sensor or a yaw rate sensor, located in suitable locations in the vehicle 22. The vehicle parameter sensor 18, however, may include any suitable device that detects the presence or absence of a situation in which the occupant of the seat 10 may prefer or need to have an increased engagement of the adjustable bolster 12.

The control unit 20 functions to receive and process data from the occupant detection sensor 16, the feedback force sensor 14, and the vehicle parameter sensor 18 and to determine and send an input parameter to the adjustable bolster 12. The input parameter preferably controls the adjustable bolster 12. If the adjustable bolster 12 includes the inflatable bladder 28 and the pneumatic pump 30, the input parameter is preferably a pressure parameter for the inflatable bladder 28. If the adjustable bolster 12 includes a paddle and a motor, the input parameter is preferably a position parameter for the paddle. The input parameter, however, may include any suitable parameter that controls the adjustable bolster 12 on the seat 10. The control unit 20 is preferably made in a conventional manner, which includes a microprocessor and a memory device (not shown), but may alternatively be made in any suitable manner. The control unit 20 is preferably located within a floor of the vehicle 22, but may alternatively be located in any suitable location in the vehicle 22.

The preferred method of the invention for adjusting the input parameter of the adjustable bolster includes (a) establishing a relationship between the input parameter and a feedback force on the adjustable bolster and (b) adjusting the input parameter based on the relationship. The preferred method further includes more specific acts as described below. An alternative method may, however, include additional suitable acts.

Figure 3:
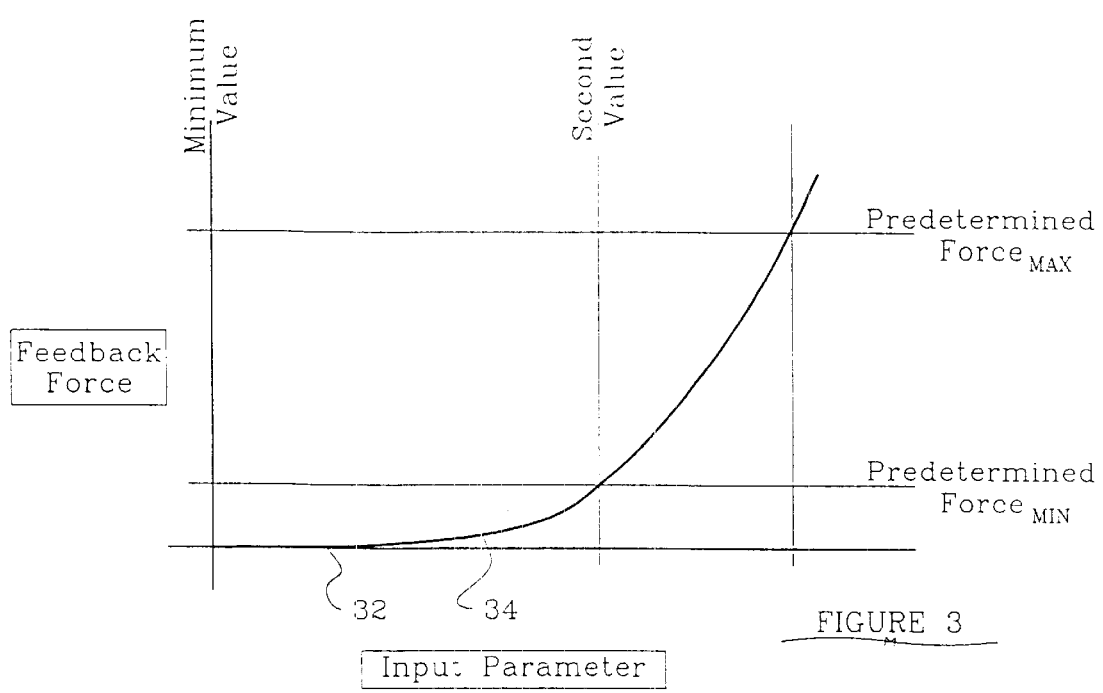
FIG. 3 is a graphical representation of the relationship between the input parameter of the adjustable bolster and the feedback force, which is established with the preferred method of the invention.

The act of establishing a relationship between the input parameter and the feedback force, which is graphically represented in FIG. 3, includes sensing the feedback force on the adjustable bolster for a value of the input parameter. The act further includes increasing the input parameter to a second value such that the feedback force substantially equals a predetermined force$_{min}$. The relationship between the input parameter and feedback force will differ based on the particular size, materials, and placement of the adjustable bolster and the particular size and structure of the occupant on the seat. The relationship will most likely include a first segment 32 in which an increase of the input parameter does not affect the feedback force on the adjustable bolster. In this first segment 32, the adjustable bolster may simply be moving toward the occupant before any contact occurs between the adjustable bolster and the occupant. The relationship may also include a second segment 34 in which an increase of the input parameter begins to register a feedback force on the adjustable bolster. There is a point as the engagement of the adjustable bolster increases that will provide the baseline for future control of the input parameter. This point is referred to as the predetermined force$_{min}$. The predetermined force$_{min}$ is preferably a minimum force that the occupant of the seat will desire from the adjustable bolster during the situations that do not require engagement of the adjustable bolster.

The act of adjusting the input parameter is preferably based on the second value. The act includes sensing the vehicle parameter of the vehicle, comparing the vehicle parameter to an activation threshold, and increasing the input parameter if the vehicle parameter$\geq$the activation threshold. As an example, if the lateral acceleration of the vehicle$\geq$a predetermined amount, the control unit increases the input parameter, which increases the engagement of the adjustable bolsters. Preferably, the input parameter is increased while sensing a feedback force on the adjustable bolster. More preferably, the input parameter is increased from the adjustable bolster until the feedback force substantially equals a predetermined force$_{max}$. The predetermined force$_{max}$ is preferably a maximum force that the occupant of the seat will desire during a situation that requires engagement of the adjustable bolster. In this manner, the input parameter of the adjustable bolster is not increased past a point in which the adjustable bolster would provide an uncomfortable force against the skin and structure of the occupant of the seat. The act of adjusting the input parameter also includes comparing the vehicle parameter to a deactivation threshold, after the adjustable bolster has been engaged. The control unit decreases the input parameter, which decreases the engagement of the adjustable bolsters, if the vehicle parameter$\leq$the deactivation threshold. In the preferred method, the control unit decreases the input parameter to the second value, which will provide the predetermined force$_{min}$ to the skin and structure of the occupant of the seat.

The preferred method of the invention also includes commencing acts (a) and (b) after the occurrence of a particular event. In one version of the preferred method, the particular event is a detection of an occupant in the seat, which is preferably sensed by the occupant detection sensor but may alternatively be accomplished by any suitable sensor. In another version, the particular event is a closing of a door of the vehicle, which is sensed by a conventional door sensor but may alternatively be accomplished by any suitable sensor. In a further version, the particular event is a starting of an engine of the vehicle, which is preferably sensed by a conventional ignition sensor but may alternatively be accomplished by any suitable sensor. The particular event, however, may be any suitable event in which to begin the acts of the preferred method.

The preferred method of the invention also includes decreasing the input parameter to a minimum value upon the occurrence of a particular event. In one version of the preferred method, the particular event is an opening of the door of a vehicle, which is preferably sensed by a conventional door sensor (not shown) but may alternatively be accomplished by any suitable sensor. In another version, the particular event is the shutting off of the engine of the vehicle, which is preferably sensed by a conventional ignition sensor but may alternatively be accomplished by any suitable sensor. The particular event in which to decrease the input parameter to a minimum value, however, may alternatively be any suitable event in which to end the acts of the preferred method.

As any person skilled in the art of seating systems will recognize from the previous detailed description and from the figures and claims, modifications and changes can be made to the preferred method of the invention without departing from the scope of this invention defined in the following claims.

We claim:

1. A method for adjusting an input parameter of an adjustable bolster on a seat of a vehicle, comprising:

(a) establishing a relationship between the input parameter and a feedback force on the adjustable bolster; and (b) adjusting the input parameter based on the relationship.

2. The method of claim 1 wherein (a) includes sensing a feedback force on the adjustable bolster for a value of the input parameter.

3. The method of claim 2 wherein (a) further includes increasing the input parameter to a second value such that the feedback force substantially equals a predetermined $force_{min}$.

4. The method of claim 3 wherein (b) includes adjusting the input parameter based on the second value.

5. The method of claim 4 wherein (b) includes sensing a vehicle parameter of the vehicle, comparing the vehicle parameter to an activation threshold, and increasing the input parameter if the vehicle parameter $\geq$ activation threshold.

6. The method of claim 5 wherein increasing the input parameter includes sensing a feedback force on the adjustable bolster and increasing the input parameter until the feedback force substantially equals a predetermined $force_{max}$.

7. The method of claim 6 wherein (b) includes comparing the vehicle parameter to a deactivation threshold and decreasing the input parameter to the second value if the vehicle parameter $\leq$ deactivation threshold.

8. The method of claim 1 wherein (b) includes sensing a vehicle parameter of the vehicle, comparing the vehicle parameter to an activation threshold, and increasing the input parameter if the vehicle parameter $\geq$ activation threshold.

9. The method of claim 8 wherein increasing the input parameter includes sensing a feedback force on the adjustable bolster and increasing the input parameter until the feedback force substantially equals a predetermined $force_{max}$.

10. The method of claim 1 further comprising commencing (a) and (b) after the occurrence of a particular event.

11. The method of claim 10 wherein the particular event is a starting of an engine of the vehicle.

12. The method of claim 10 wherein the particular event is a closing of a door of the vehicle.

13. The method of claim 10 wherein the particular event is a detection of an occupant in the seat.

14. The method of claim 1 further comprising decreasing the input parameter to a minimum value upon the occurrence of a particular event.

15. The method of claim 14 wherein the particular event is a shutting off of an engine of the vehicle.

16. The method of claim 14 wherein the particular event is an opening of a door of the vehicle.

* * * * *